Figure 4:
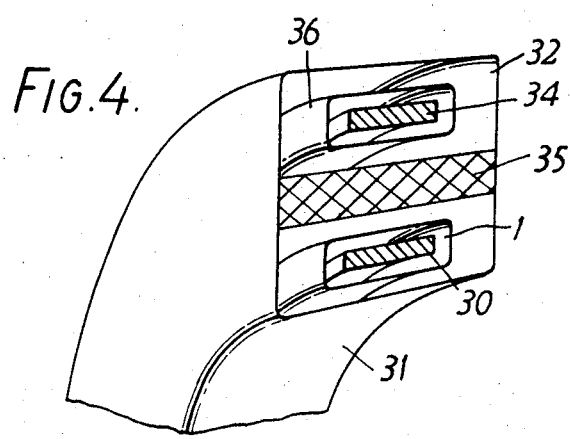

United States Patent [19]
Tinlin

[11] 3,708,705
[45] Jan. 2, 1973

[54] LOW TEMPERATURE APPARATUS

[75] Inventor: Frank Tinlin, Newcastle upon Tyne, England

[73] Assignee: International Research & Development Company Limited, Newcastle upon Tyne, England

[22] Filed: March 1, 1971

[21] Appl. No.: 119,627

Related U.S. Application Data

[62] Division of Ser. No. 851,004, Aug. 18, 1969, abandoned.

[30] Foreign Application Priority Data

Aug. 27, 1968 Great Britain..................40,897/68

[52] U.S. Cl. ....................310/52, 62/467, 62/514
[51] Int. Cl. ....................................H02k 9/00
[58] Field of Search......310/52, 40, 64, 178, 65, 258; 62/502, 475, 602, 514, 467

[56] References Cited

UNITED STATES PATENTS

| | | | |
|---|---|---|---|
| 3,368,087 | 2/1968 | Madsen | 310/40 |
| 2,986,905 | 6/1961 | Kocher | 62/475 |
| 3,521,091 | 7/1970 | Halas | 310/52 |
| 3,469,121 | 9/1969 | Smith | 310/40 |
| 3,517,231 | 6/1970 | Massar | 310/52 |
| 3,292,021 | 12/1966 | Hoag | 310/40 |

Primary Examiner—R. Skudy
Attorney—Kemon, Palmer & Estabrook

[57] ABSTRACT

A cryostat for cooling superconducting windings in a homopolar dynamo-electric machine, which has two spaced inner members containing the windings and cooled by cryogenic fluid and an outer member enclosing a vacuum space around the inner members, wherein the refrigeration plant for the cryogenic fluid with the exception of the compressor, is disposed in the vacuum space between the inner members to eliminate the need for thermally insulated transfer lines.

5 Claims, 7 Drawing Figures

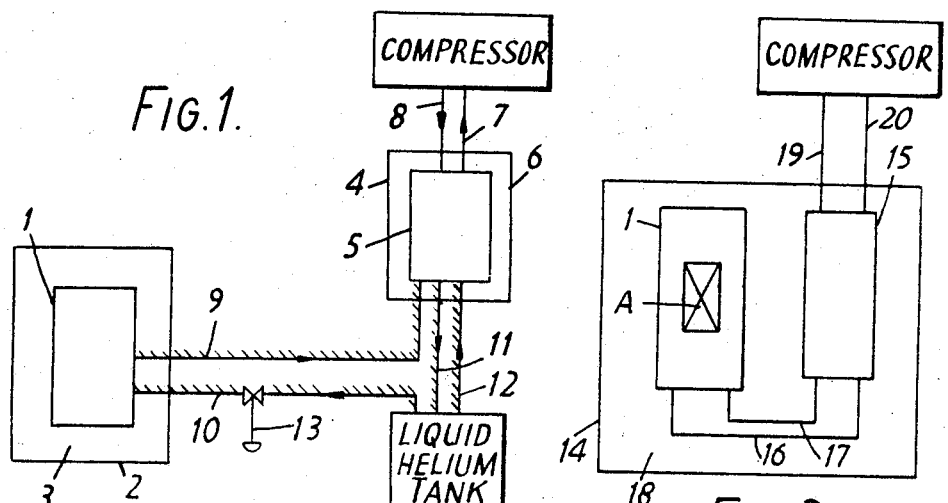
FIG.1.
FIG.2.
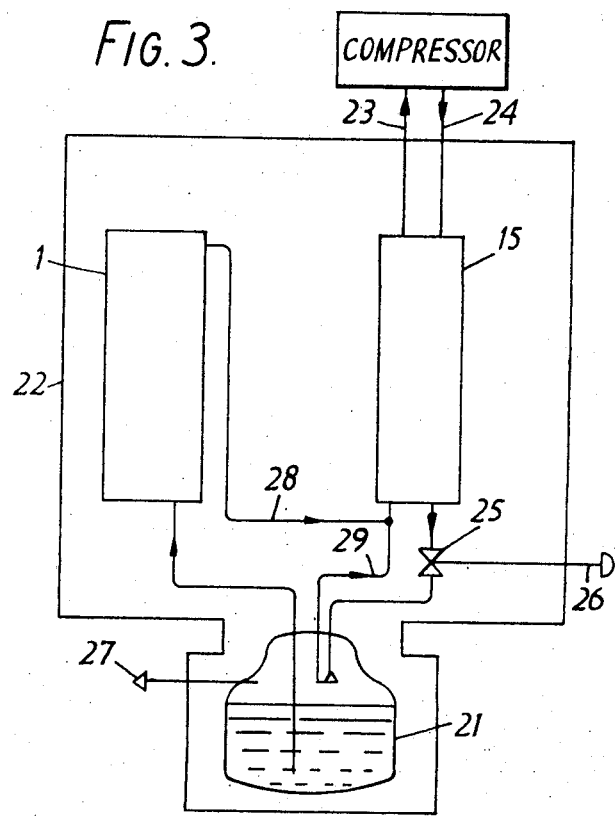
FIG.3.

LOW TEMPERATURE APPARATUS

This application is a divisional application derived from my co-pending application Ser. No. 851,004, now abandoned.

This invention relates to low temperature apparatus and is particularly concerned with arrangements for maintaining low temperatures in dynamo-electric machines of the type where superconducting windings to be maintained at low temperatures are enclosed within a cryostat.

Practical developments in the field of the low temperature engineering such as, for example, the advent of dynamo-electric machine windings using superconducting wire, have called for improvements in means for maintaining at very low temperature containers housing low temperature components. Such containers, generally referred to as cryostats, may be required to maintain components at temperatures as low as a few degrees absolute, and generally comprise inner and outer vessels with a space between them in which a vacuum obtains, the inner vessel containing the low temperature components.

One method of achieving and maintaining the low temperatures described is to substantially fill the inner vessel of a cryostat with a cryogenic fluid, for example, liquid helium (boiling point 4.2° K at normal atmospheric pressure), and to circulate the fluid through a refrigerator plant connected to the cryostat by means of cryogenic transfer lines, that is to say, tubes having an insulating vacuum surrounding them.

The refrigerator plant may comprise an appreciable number of elements including possibly several heat exchangers, gas adsorbers, expansion engines, cryogenic expansion valves, control valves and a compressor. The majority of these elements are either connected to other elements or to the cryostat or both. The resulting multiplicity of transfer lines means that increased refrigerating power is required to compensate for losses in the lines.

In our British Pat. specification No. 1,133,724 we describe a homopolar dynamo-electric machine comprising a stator having a superconducting winding providing a magnetic field which cuts one or more electrical current conducting paths on a rotor. The stator winding for a disc rotor machine shown in the above application comprises a superconducting winding located in a toroidally-shaped cryostat. The cryostat may comprise an outer member in the form of an annular casing having an inner member in the form of a toroidal container situated within and in spaced relation to the outer member, the inner member containing the coils of the winding and also cryogenic fluid in which the coils are immersed to maintain them superconducting, and the space between the casing and container being a vacuum space.

The above-mentioned British Pat. specification No. 1,133,724 also described an arrangement whereby a further superconducting screening coil of larger diameter than the stator winding could be placed around the latter in a separate cryostat. According to the present invention a single cryostat is used for both the stator winding and screening coil, the cryostat comprising a single toroidal outer casing which may be evacuated and two inner concentric toroidal containers. The inner container of smaller mean diameter may thus contain the stator winding and that of larger diameter the screening coil, both immersed in cryogenic fluid in their respective containers, and the annular space within the evacuated outer casing between and in the plane of the winding and coil may contain elements of the refrigerator plant and their interconnecting transfer lines.

In another form of the present invention a single cryostat may be used for two superconducting stator windings in a twin-coil, drum-type homopolar machine. The two windings may be toroidal windings of the same mean diameter and be positioned on the same axis but in axially spaced relationship, each being immersed in liquid helium in a respective inner container of the cryostat. The outer casing may then be arranged to surround both inner containers and elements of the refrigerator plant for the liquid helium may be disposed in the annular cylindrical-walled space between the two windings, in which space a vacuum is maintained.

Figure 5:
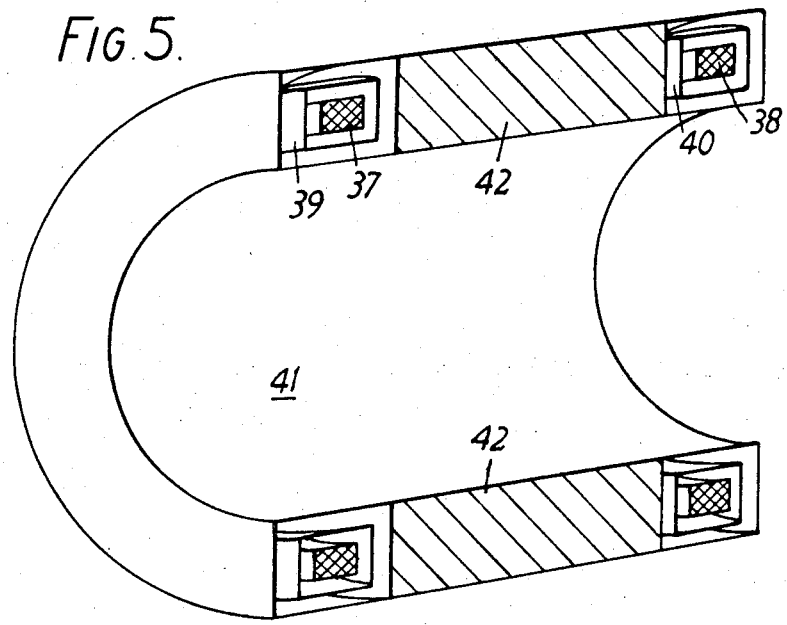
Figure 6:
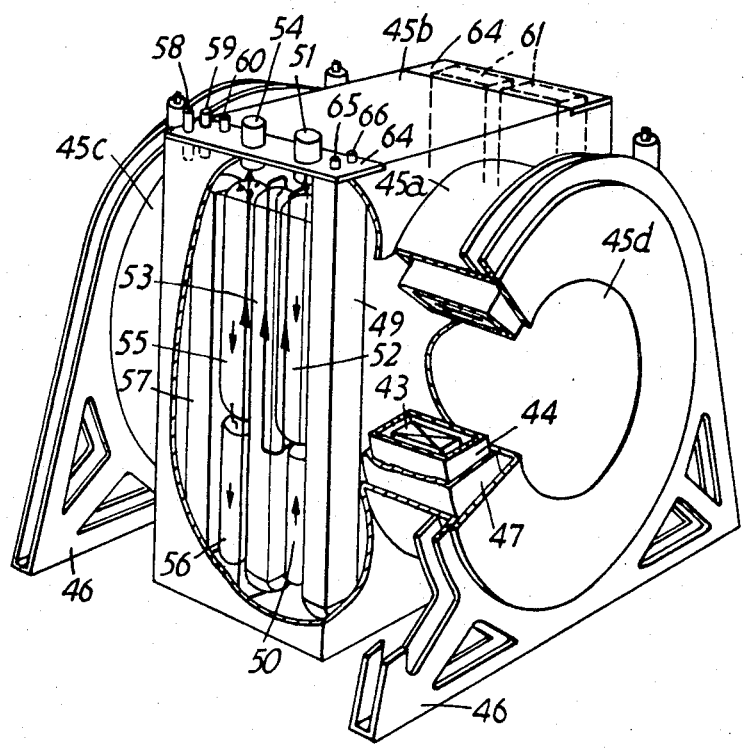
Figure 7:
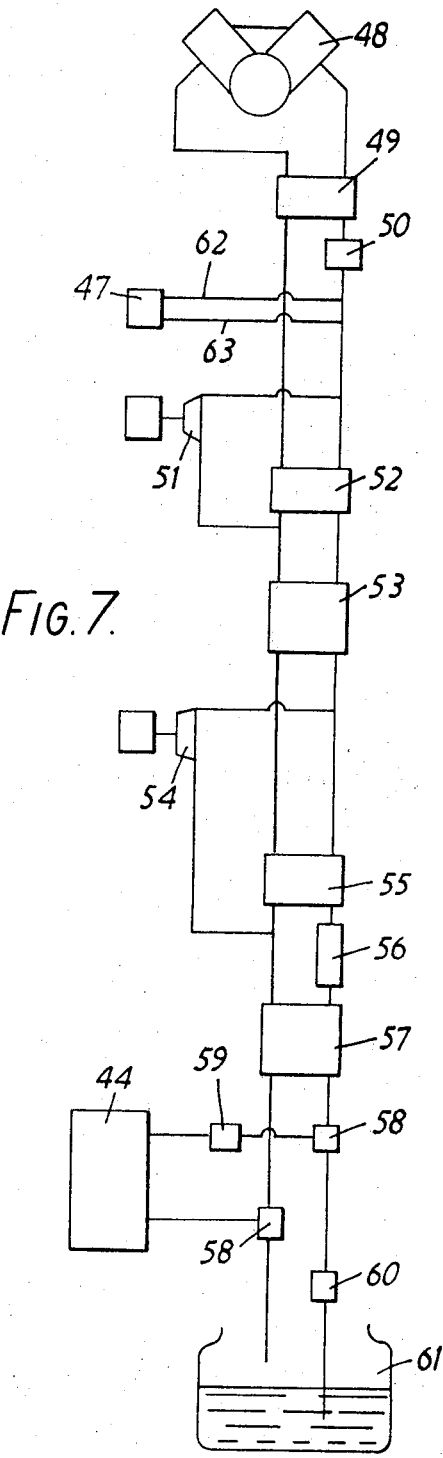

Further details of specific embodiments of the present invention and a comparison with conventional low temperature apparatus will now be described with reference to the accompanying drawings, in which:

FIG. 1 shows a flow line diagram for low temperature apparatus in accordance with conventional arrangements of such apparatus, FIG. 2 shows a flow line diagram for low temperature apparatus in accordance with one form of the present invention, FIG. 3 shows a flow line diagram for low temperature apparatus in accordance with an alternative form of the present invention, FIG. 4 shows a cut-away perspective view of a portion of a stator winding cooling arrangement in accordance with the present invention for a disc rotor type of homopolar dynamo-electric machine, FIG. 5 shows a cut-away perspective view of a stator winding cooling arrangement in accordance with the present invention for a drum rotor type of homopolar dynamo-electric machine, FIG. 6 shows a cut-away perspective view of a drum rotor type of homopolar dynamo-electric machine having an alternative stator winding cooling arrangement to that shown in FIG. 5, and FIG. 7 is a flow diagram of the refrigerator plant used in the machine shown in FIG. 6.

Referring first to FIG. 1, the low temperature apparatus shown comprises a conventional arrangement for maintaining components at a temperature in the region of 4.5° K within a container 1.

The low temperature in container 1 is achieved and maintained by filling it with sufficient liquid helium to completely immerse therein the components, which may comprise a superconducting dynamo-electric machine stator winding. An outer casing 2 surrounds container 1 and is spaced from it by a vacuum space 3, container 1 and casing 2 thus comprising a cryostat with the liquid helium as cryogenic fluid.

A refrigerator plant for the helium in container 1 comprises a plurality of elements situated in a cold box 4, a compressor and a liquid helium storage tank. Cold box 4 is a further cryostat having an inner cavity in which the refrigerator elements, indicated generally by block 5, are contained, and an insulating vacuum space 6. In a typical example, the elements in block 5 may comprise heat exchangers, expansion engines (of piston or rotary type), gas adsorbers to remove impurities from the helium and cryogenic expansion valves which may be operated from outside box 4.

Details of the arrangement of refrigerator elements within box 4 do not form part of the present invention but, essentially, gaseous helium flows from box 4 to the compressor and back again through transfer lines 7, 8, which do not require vacuum insulation, whilst liquid helium or saturated gaseous helium flowing between box 4, the liquid helium tank and container 1 flows through transfer lines 9, 10, 11 and 12 which must be vacuum insulated cryogenic transfer lines. A vacuum insulated cryogenic expansion valve 13 is also required in line 10. For the sake of clarity a radiation shield, which may be cooled by helium and situated between container 1 and casing 2, has been omitted from FIG. 1. Cryogenic tranfer lines required between such a shield and heat exchangers in the cold box 4 have also been omitted.

In practical apparatus employing the arrangement shown in FIG. 1, the cryogenic transfer lines would be kept as short as possible but the amount of additional load which they impose on the refrigerator system is nevertheless considerable. Such lines generally comprise a thin-walled inner tube of metal or glass surrounded by an outer tube with the space between the tubes being evacuated and are by nature of their construction unsuitable for use in apparatus where they are liable to vibration, mechanical shock or damage by impact.

The disadvantages of cryogenic transfer lines may be obviated in apparatus according to the present invention by arranging a substantial proportion of the elements of the refrigerator plant within the vacuum space between the outer and inner members of the cryostat containing the windings to be cooled.

Referring to FIG. 2, apparatus in accordance with one form of the present invention is shown suitable for maintaining components at temperatures in the region of 7° – 12° K using helium gas as cryogenic fluid within a cryostat. The cryostat again comprises an inner member in the form of a container 1 which may be basically the same as the container 1 of FIG. 1 and contain, for example, a superconducting winding A of the dynamo-electric machine.

The outer member 14 of the cryostat comprises a casing which is sufficiently large to accommodate a cavity in which may be disposed refrigerator elements, indicated generally by block 15, similar to those which were disposed in block 5 of the cold box 4 in FIG. 1.

In the arrangement of FIG. 2 the cold box is thus dispensed with and the transfer lines 16, 17, between container 1 and the refrigerator elements represented by block 15 need not be of the vacuum insulated cryogenic type. Lines 16, 17, may be simple tubes of suitable material, for example steel, insulated by the vacuum space 18 existing between and surrounding container 1 and the refrigerator elements 15. It may still be necessary to place the compressor outside casing 14, but the transfer lines 19, 20 leading gaseous helium between the compressor and the refrigerator elements 15, need not be of the cryogenic type.

Controls for valves which may be required between elements of the refrigerator plant within casing 14 can be arranged to pass through the wall of the casing by vacuum-tight means. Certain refrigerator elements, such as expansion engines, lying within casing 14 may require drives which pass through its walls. The drives for such elements, or the elements themselves, may pass through vacuum-tight passages in the walls of casing 14 thus facilitating servicing of the drives or elements without losing the vacuum in space 18. Servicing may thus be carried out without the need to re-cool the system and shut-down of equipment employing the components within vessel 1 may be obviated.

In an alternative arrangement of apparatus in accordance with the invention shown in FIG. 3, liquid helium may be used to achieve low temperatures of the order of 4.5° K in a system similar to that shown in FIG. 1, but with the liquid helium storage tank 21 disposed within an evacuated outer casing 22 in addition to refrigerator elements represented by block 15.

The compressor, as in the apparatus shown in FIG. 2, may still be required to be outside casing 22, but the transfer lines 23, 24 leading gaseous helium to and from it again need not be vacuum insulated cryogenic lines. The remaining refrigerator elements, that is to say, heat exchangers, expansion engines, adsorbers and valves represented by block 15, a cryogenic expansion valve 25, the liquid helium storage tank and transfer lines may all be disposed in the vacuum within casing 22, thus making the use of vacuum insulated cryogenic lines unnecessary.

The cryogenic expansion valve may be operated by means, indicated by reference numeral 26, passing through the wall of casing 22, as may other valves required within the refrigerator system. Arrangements for expansion engines may also be similar to those described for the apparatus shown in FIG. 2.

The liquid helium tank 21 is closed and leak-tight and may be provided with a bursting disc 27. Lines 28, 29 are return lines for helium gas boiling off from the liquid helium in container 1 and in storage tank 21. Provision may be made for tapping off helium liquid from tank 21 for other purposes than cooling the components in container 1 and the apparatus may be replenished by helium gas fed into line 23 by means not shown in FIG. 3.

Radiation shields which may be provided to surround containers 1 in the apparatus shown in FIGS. 2 and 3 and details of cryogenic and control valves required within the apparatus have been omitted for the sake of clarity. Supporting means for container 1, the refrigerator elements represented by block 15 and the liquid helium tank 21 shown in FIG. 3 are not shown but must be designed to be such as to minimize conduction of heat to these members from the outer vasing 22 in which they are disposed and supported.

The remaining figures indicate practical arrangements of apparatus in accordance with the invention.

In FIG. 4 an annular stator field winding 30 for a disc rotor type of homopolar superconducting dynamo-electric machine is contained within an inner toroidal container 1. Container 1 is positioned within an outer toroidal casing 31. The rotor of the machine is not shown but is located concentrically with the casing 31 which surrounds it, whilst lying outside the casing 31.

Stator winding 30 is wound with superconducting wire and in order that the wire may operate in a superconductive manner it must be maintained at a very low temperature between, say, 4.5° – 12° K, depending upon the particular superconducting material employed. This may be achieved by substantially filling container 1 with liquid helium to immerse winding 30 and evacuating the space 32 between container 1 and casing 31.

A further superconducting coil 34 concentric with winding 30 is incorporated to degauss the magnetic field surrounding winding 30. In accordance with the present invention both winding 30 and coil 34 may be surrounded by a single toroidal casing 31 of rectangular cross-section, an annular space, the cross-section of which is indicated by cross-hatching at 35, being provided to accommodate refrigerator elements. Coil 34 may be immersed in liquid helium in its own toroidal container 36 and the space 32 would again be evacuated.

The refrigerator plant employed may be substantially as shown in FIG. 3, the elements represented by block 15 and the cryogenic expansion valve being disposed in the annular space 35 whilst the compressor is situated outside casing 31. Whilst the annular space 35 could be made sufficiently large to include also the liquid helium tank, the latter would preferably be situated in a separate, suitably shaped, enlarged portion of casing 31 at, say, its lower portion.

In the arrangement of FIG. 5, two coaxial superconducting toroidal stator field windings 37 and 38 for a drum rotor type of homopolar dynamo-electric machine are shown. Each may be immersed in liquid helium in a respective container 39, 40, and an outer evacuated casing 41 may surround both containers 39 and 40 leaving a cylindrical-walled space 42 (shown shaded) in which refrigerator elements may be disposed. More than two coaxial windings could be arranged in a similar fashion.

FIG. 6 shows in more detail a homopolar dynamo-electric machine of the drum rotor type having two coaxial superconducting toroidal stator field windings cooled in accordance with the present invention. The machine has two superconducting toroidal stator field windings 43 of equal diameter disposed towards each of the axially opposed ends of the machine, only one of the windings being visible in FIG. 7. Each winding is supported within a container 44 which forms an inner member of a single cryostat for the machine, the common outer member of the cryostat comprising a casing 45 formed of two cylindrical end portions 45a and 45c and a generally box-shaped central portion 45b.

The machine of FIG. 6 is shown with its drum rotor removed. The rotor when in position is situated in a hollow cylindrical portion 45d of the outer casing and is supported by bearings, also not shown, which in turn are supported by end frames 46 of the machine.

Windings 43 are surrounded by cryogenic fluid, for example liquid helium, within containers 44, the space between each container 44 and casing 45 being a vacuum space. Radiation shields 47 are situated in the vacuum space between containers 44 and casing 45 to minimize radiation of heat to the containers.

In accordance with the present invention, the vacuum space within casing 45 in which the two containers 44 are situated also contains elements of refrigeration plant for the afore-mentioned cryogenic fluid. The refrigeration plant elements are disposed within the box-shaped central portion 45b of the casing and which particular elements are disposed within this portion is made clear by reference to the refrigeration plant flow diagram shown in FIG. 7.

Referring to FIG. 7, the refrigeration plant shown comprises a compressor 48 situated outside of the casing 45 of the machine shown in FIG. 6, and the following elements disposed wholly or partly within casing 45:

i. A first principal heat exchanger 49.
ii. A gas adsorber 50 adsorbing principally oxygen and nitrogen.
iii. A first expansion turbine 51.
iv. A heat exchanger 52 associated with turbine 51.
v. A second principal heat exchanger 53.
vi. A second expansion turbine 54.
vii. A heat exchanger 55 associated with turbine 54.
viii. A neon adsorber 56.
ix. A heat exchanger 57 associated with the cryogenic expansion valves of the plant.
x. Flow control valves 58.
xi. A cryogenic expansion valve 59 (commonly referred to as a Joule-Thompson valve).
xii. A further cryogenic expansion valve 60, and
xiii. A liquid helium storage tank 61.

Lines 62 and 63 lead gaseous helium to radiation shields 47 whilst the field coil containers 44, indicated by a single block in FIG. 7 are supplied with liquid helium.

The refrigerator elements are preferably supported by flanges 64 bolted to casing 45 so that they may be removed when necessary by removing the flanges from the casing. The connections to compressor 48 are made by way of an inlet 65 and an outlet 66 in flange 64.

Details of control valves with the refrigeration plant shown in FIG. 7 are not fully shown, but the principal purposes of valves and lines not shown are to allow stages of the plant to be cooled down successively, whilst the purpose of control valves 58 is to allow liquid helium produced either to be circulated through casings 44 or stored in tank 61.

In any of the examples described where liquid helium is mentioned as being the cryogenic fluid, it will be understood that gaseous helium cooling systems could be employed provided that the temperature required to maintain the particular superconducting material which is in contact with the fluid in the superconductive state is maintained.

I claim:

1. In a dynamo-electric machine, a first superconducting winding forming a field winding of the machine, a second superconducting winding, a cryostat having an outer member enclosing a vacuum space, a first inner member housing said first winding, and a second inner member housing said second winding, said first and second inner members being disposed in spaced-apart relation within said vacuum space, and a refrigerator plant coupled to the said inner members of the cryostat to supply cryogenic fluid thereto, at least part of the operating cold producing portions of said refrigerator plant being disposed within the vacuum space and and located between the first and second inner members.

2. In a machine as claimed in claim 1, a storage vessel for cryogenic fluid located in the said vacuum space within the outer member of the cryostat.

3. In a machine as claimed in claim 1, a rotor and an armature winding of non-superconducting material on said rotor, the cryostat being of annular form and encircling the periphery of the rotor.

4. In a machine as claimed in claim 3, said second winding being a coil of larger diameter then said first winding, said windings being disposed in a common plane, and said second winding acting as a degaussing winding to counteract the field of said first winding in selected regions.

5. In a machine as claimed in claim 1, a drum-type rotor, said cryostat being of generally cylindrical form and encircling said rotor, said first and second windings being annular coils and said first and second inner members being spaced apart axially of the drum-type rotor.

* * * * *